Aug. 30, 1932.  L. W. THOMPSON  1,875,279
ELECTRICAL REGULATING APPARATUS
Filed April 19, 1929

Inventor:
Louis W. Thompson,
by Charles E. Tullar
His Attorney.

Patented Aug. 30, 1932

1,875,279

UNITED STATES PATENT OFFICE

LOUIS W. THOMPSON, OF SCHENECTADY, NEW YORK, ASSIGNOR TO GENERAL ELECTRIC COMPANY, A CORPORATION OF NEW YORK

ELECTRICAL REGULATING APPARATUS

Application filed April 19, 1929. Serial No. 356,529.

My invention relates to electrical regulating apparatus and more particularly to regulators of the alternating-current induction type for controlling an electrical characteristic of an electric circuit or a dynamo-electric machine. Although my invention is applicable for use in the control and regulation of electric circuits generally it is particularly applicable for use in controlling the excitation of a dynamo-electric machine to control an electrical characteristic thereof, and will be described in detail in this field of application.

In many regulating systems it is desirable to eliminate vibratory contacts and for this purpose a rheostatic type of regulator actuated by an electric motor has been used with varying degrees of success. Regulators of this type, however, are usually sluggish in action as compared to regulators of the vibratory contact type due particularly to the inertia effects of the motor actuating means and are generally unsuitable for use in systems of regulation where a sensitive and quick-acting regulator is necessary.

It is an object of my invention to provide an improved alternating-current induction-type of regulating apparatus.

Another object of my invention is to provide an improved alternating-current induction-type of regulating apparatus for effecting the regulation or control of an electric circuit or of a dynamo-electric machine.

A further object of my invention is to provide an improved type of rheostatic regulator and system of regulation which is simple and rugged in construction, reliable in operation, and which approaches the vibratory contact type of regulator in sensitiveness to small or large variations in the electrical characteristic to be regulated.

A still further object of my invention is to provide an improved regulating resistor in a regulating system of the rheostatic type.

The novel features which I believe to be characteristic of my invention are set forth with particularity in the appended claims. The invention itself, however, both as to organization and method of operation together with further objects and advantages thereof, will best be understood by reference to the following description taken in connection with the accompanying drawing in which Fig. 1 is a diagrammatic illustratration of an embodiment of my invention in a regulating system for an alternating-current dynamo-electric machine, and Fig. 2 is an embodiment of my invention in a regulating system for a direct current dynamo-electric machine.

Figure 1:
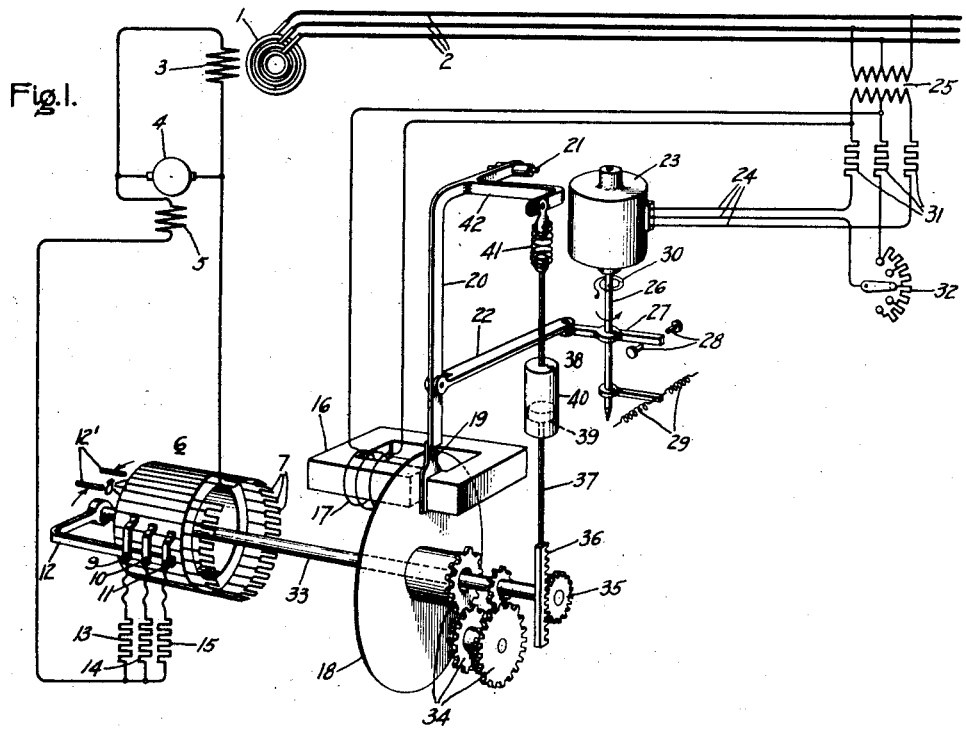
Figure 2:
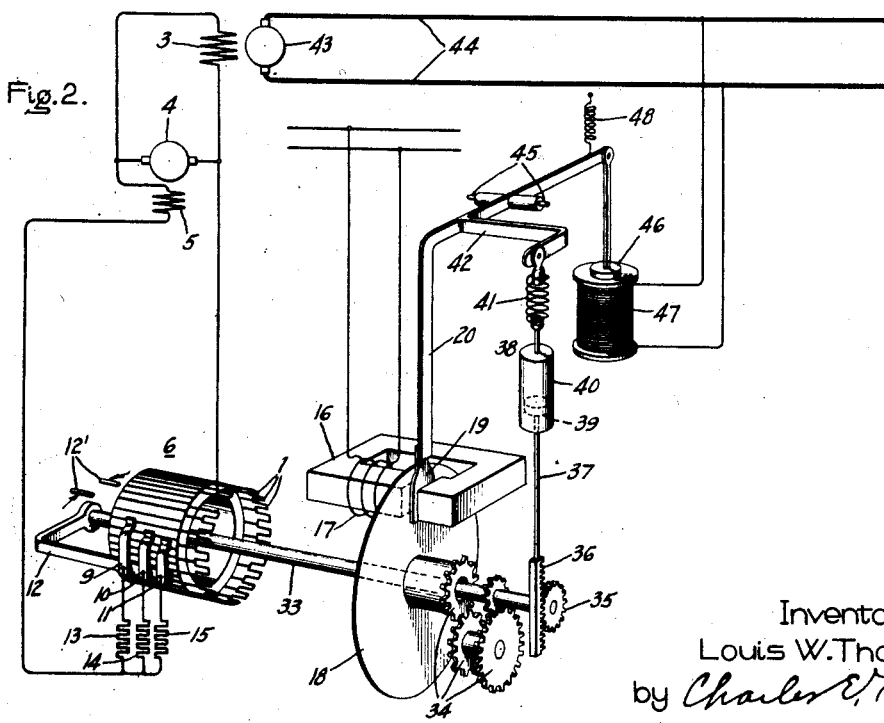

Referring to Fig. 1 of the drawing, 1 indicates an alternating current dynamo-electric machine which is to be controlled. As shown, the dynamo-electric machine 1 represents a three-phase alternating current generator of the synchronous type which is connected to supply electrical energy to a distribution circuit 2. The machine 1 is provided with a field winding 3 which is connected to be energized from a suitable source of excitation indicated by the armature of a direct-current generator and designated as exciter 4. The exciter 4 is provided with a field winding 5 which for purposes of illustration is shown connected to be energized from the armature of exciter 4, although any suitable arrangement of separate excitation may be used without departing from my invention in its broader aspects. The energization of field winding 5 is controlled by circuit controlling means 6. For this purpose I provide preferably a rheostatic type of circuit controlling means comprising a resistor 7 which is divided into sections by taps and connected to different insulated segments 8 of a commutator preferably of a cylindrical form. The value of the respective resistance steps between taps on resistance 7 are preferably designed with reference to the saturation characteristic curve of the particular exciter used in order to obtain the proper changes in resistance, and thereby the field current, throughout the operating range. A movable contact device is arranged in cooperative relation with the commutator segments 8 for effecting a plurality of successive changes in resistance in the excitation circuit of exciter 4 during the transition from one commutator segment to the next in either direction of travel. For this purpose I provide a plurality of separately insulated brushes 9, 10 and 11 arranged in cooperative relation with said commutator segments and supported by a brushholder 12. Stops 12' are provided to limit the travel of brushholder 12 in either direction of travel. The brushes are arranged for successive initial engagement with each commutator segment in either direction of travel and a convenient arrangement is to place each brush slightly in advance of a succeeding brush proceeding from right to left as viewed in the drawing with respect to the longitudinal axis of any commutator segment.

A resistor is connected in series with each contact and with the particular order of advance of the contacts illustrated the resistors are preferably of different values increasing in accordance with the order of advance of the brushes. For example, resistors 13, 14 and 15 are connected in series with brushes 9, 10 and 11 respectively in the proportions of the order of 10, 5 and 1, but it will be apparent that adherence to these particular proportions is not essential for carrying out my invention. It will also be apparent, that any practical number of contacts and resistors may be used with a given number of commutator resistor sections depending upon the number and magnitude of the resistance steps desired, since the number of steps possible with any given combination is equal to the product of the number of commutator resistor sections and the number of contacts used. It will be observed that the energizing circuit of field winding 5 is from the armature terminal of exciter 4, through various sections of resistor 7, through brushes 9, 10 and 11 and resistors 13, 14 and 15 which are connected to a common point, and from thence through field winding 5 to the other armature terminal of exciter 4. When all the brushes are in contact with the same commutator segment the circuit is through the sections of resistor 7 which may have been introduced into the circuit and the resistances 13, 14 and 15 in parallel relation. Movement of the brushholder 12 first places one of the resistors 13 or 15, depending upon the direction of rotation, in series with a resistor section about to be included or excluded in the excitation circuit and leaves the remainder of the brush resistors in parallel with the new series group. Further movement in the same direction places two brush resistors in parallel relation and in series with the same resistor section and leaves one brush resistor in parallel with the series parallel group comprising a section of resistor 7 and the two brush resistors in parallel. Still further movement in the same direction includes or excludes the section of resistor 7 under consideration and places all the brushes on the same segment and therefore places all brush resistors in parallel relation in series with the sections of resistor 7 included in the excitation circuit. Thus instead of changing the resistance in steps corresponding to the value of the resistor section between adjacent commutator segments in one step, the change is effected in three steps with the particular arrangement illustrated, thereby affording a plurality of fine steps throughout the operating range with a main resistance having a comparatively small number of coarse steps.

In accordance with my invention the means for actuating the circuit controlling means 6 comprises an alternating-current induction-type motive device having a primary inducing member and a movable secondary induced member whose direction of movement is controlled by flux shifting means. While it is desirable in the usual automatic regulating system for an electric circuit or a dynamo-electric machine to control the direction of movement of the induced member in accordance with an electrical characteristic of the circuit or machine to be controlled, various modifications in other applications to effect control by the induced member, manually, or automatically in accordance with other regulatable conditions, such as, speed, temperature, light, etc., will occur to those skilled in the art, and may be used, if preferred, without departing from my invention in its broader aspects.

In the embodiment of my invention herein particularly described I provide a motive device with a single-phase primary inducing member comprising a magnetizable core 16 and an energizing winding 17 mounted on the core and connected to be energized from one phase of the circuit 2; although the excitation may be derived from any other convenient source of alternating current as shown in Fig. 2. The core 16 may be constructed in any convenient shape but a rectangular-shaped core having an air gap in one of the legs of the core as illustrated in the drawing has been found satisfactory in practice. A secondary induced member 18 of conducting material, such as aluminum and preferably in the form of a disk, is arranged to have its peripheral portion rotate between the polar surfaces formed in the core 16 by the air gap. A flux-modifying means is provided for producing a rotating field and for selectively determining the direction of rotation of the secondary induced member. The flux-modifying means shown comprises a closed circuit conductor preferably in the form of a copper plate arranged to traverse the flux gap between one polar surface of core 16 and the disk 18 in order to shade any desired portion of the pole. It will be obvious to those skilled in the art that the closed circuit conductor may take the form of a ring or rectangular-shaped closed circuit conducting turn or turns without departing from my invention in its broader aspects. The closed circuit conductor is arranged so that the disk 18 may be traversed partly by flux from a shaded portion of the pole in order to obtain rotation of the disk in one direction or the other depending upon the side of the pole which is shaded. Since the disk tends to rotate with the flux, i. e., from the unshaded to the shaded portion of the pole, it will be readily understood that the direction of rotation of the disk may be controlled by controlling the position of the closed circuit conductor. It is also to be noted that when the closed circuit conductor 19 shades the pole completely there is no tendency of the disk to rotate and the secondary induced member remains stationary.

For regulating purposes the position of the closed circuit conductor 19 is adjusted in the flux gap with relation to the center line of the pole in accordance with the variations above or below a predetermined value of an electrical characteristic, such as the voltage, of the circuit to be controlled. In the particular embodiment of my invention herein disclosed, the copper plate 19 is mounted on the vertical portion of an inverted L-shaped lever arm 20 which is arranged to be pivoted by suitable bearing means at the extremity of the horizontal base portion of the L by pivots 21. An arm 22 is attached to the vertical portion of the lever arm 20. An electromagnetic means connected to be energized in accordance with an electrical characteristic of the circuit to be controlled is arranged to actuate the arm 22 and thereby the lever arm 20 for traversing the copper plate 19 in the flux gap. Various types of electromagnetic actuating devices within the scope of my invention will occur to those skilled in the art but for the particular application of alternating-current generator regulation herein described it is preferable to control the alternating current motive device in a manner to change the excitation of the exciter 4 in the proper direction under all practical operating conditions irrespectively of whether the system is balanced or unbalanced. Accordingly the actuating means for lever 20 is preferably a polyphase alternating-current torque motor 23 of the type described and claimed in United States Letters Patent No. 1,743,798, granted January 14, 1930, on an application of Robert H. Park, to the assignee of this application.

The actuating device 23 is essentially an induction motor operating as a torque motor and is provided with a polyphase primary inducing winding for producing a rotating magnetic field and a rotatable closed circuit induced member. The primary winding is connected by the conductors 24 to the three phases of the distribution circuit 2 by a suitable step-down transformer 25, and the rotatable closed circuit member is arranged to actuate a shaft 26 having an arm 27 attached thereto and pivoted to reciprocate arm 22 and thereby the copper plate 19. Stops 28 are positioned on each side of the arm 27 to limit the extent of its travel. The rotatable member of the actuating device 23 is biased to a predetermined neutral position by suitable means, for example, the springs 29. The torque exerted on the shaft 26 under predetermined normal conditions in circuit 2 is counterbalanced by means diagrammatically illustrated by a spring 30. As shown in more detail in the aforementioned Robert H. Park patent this counterbalancing means may be incorporated within the motor frame. Resistors 31 are connected in series with each of the conductors 24 in order to make the ohmic resistance of the primary inducing circuit high in comparison to the reactive impedance characteristic of the circuit so as to render the operation of the motor practically independent of variations in frequency. An adjustable resistor 32 is also connected in series with one phase conductor in order to provide a means to adjust the actuating device 23 to hold constant the regulated electrical characteristic at any desired value.

In addition to the neutral-positioning biasing means 29 it is desirable to provide means tending to return the copper plate 19 to its neutral position in accordance with the extent of the movement of the disk 18 of the alternating-current motive device. The rotation of the disk 18 is arranged to cause rotation of the arm 12 and thereby movement of the brushes 9, 10 and 11 by means of a shaft 33 which is connected to be rotated by suitable gearing 34 interposed between the disk 18 and the shaft 33. The shaft 33 is also provided with a pinion 35 which engages with a rack 36. The rack 36 is connected to or forms part of a shaft 37 which is arranged to exert a force on the lever arm 20 in opposition to the force from the actuating device 23 whenever the copper plate 19 is moved out of its predetermined neutral position. Means including retarded relatively movable members is interposed between the lever arm 20 and the disk 18. As diagrammatically illustrated a dashpot 38 divides the shaft 37 into two parts. The portion of the shaft 37 attached to the rack 36 is connected to the piston 39 of the dashpot and the other portion of the shaft 37 is connected to the chamber 40 of the dashpot. Preferably the copper plate 19 should be permitted to move quickly to a new position for any change in the regulated characteristic of circuit 2. This quick initial movement is obtained by placing a resilient connection diagrammatically illustrated as a spring 41 between the portion of the shaft 37 connected to the dashpot chamber 40 and the connection to the lever arm 20. The connection of the lever arm 20 is conveniently made to an arm 42 integral with shaft 20 and of such a length and direction as to permit a straight line connection from the pinion 35 carried on the extension of shaft 33.

The operation of the arrangement shown in Fig. 1 is substantially as follows: First assume that the alternating-current generator 1 is being operated and that its excitation is being furnished by exciter 4 so that the voltage on circuit 2 is at the predetermined normal value which is to be maintained constant. Under these conditions the torque tending to rotate the shaft 26 of the actuating device 23 will be balanced by the torque of the spring 30 and the copper plate 19 will be in such a position as to completely shade the pole of the magnetic core 16. The disk 18 will have no tendency to rotate and consequently there will be no tendency to change the position of the brushes and thereby the resistance included in the exciter field. Now assume that the voltage of circuit 2 falls below the predetermined normal value. Under these conditions the torque tending to rotate shaft 26 is less than the counterbalancing torque of the spring and hence the shaft 26 tends to rotate under the influence of the spring. For purposes of explanation it will be assumed that shaft 26 tends to rotate in such a direction as to move lever 20 and thereby the copper plate 19 out of the plane of the paper as viewed in Fig. 1. This movement shades the forward portion of the pole as viewed in the drawing of the alternating current motive device and causes rotation of the disc 18 in a counterclockwise direction. This direction of rotation of disk 18 causes movement of the arm 12 and thereby movement of the contact brushes 9, 10 and 11 to exclude resistance from the excitation circuit in the manner described hereinbefore and thereby return the voltage of generator 1 to its predetermined normal value.

It will be observed that movement of the lever arm 20 may take place practically simultaneously with the movement of the shaft 26 because of the spring 41 connected between the arm 42 and the chamber 40 of the dashpot. The quick initial movement of the arm 20, however, is followed by a damping action as soon as the tension in the spring 41 becomes sufficient to cause movement of the chamber of the dashpot. It will also be observed that as soon as the disk 18 starts to rotate, motion is communicated to the piston of the dashpot through the rack and pinion connection 35 and 36 and a force is initiated which is in a direction opposite to the force tending to displace the arm 20. Hence, after the action is initated and effected the arm 20 is returned to its predetermined neutral position to cause the copper plate 19 to completely shade the pole and thereby terminate rotation of the disk 18. Should the voltage of circuit 2 rise above the predetermined normal value the cycle of operation will be evident from the foregoing description. In this case the copper plate 19 is moved in a direction to shade the portion of the pole on the side opposite the center line of the pole from that portion previously shaded and more resistance is included in the excitation circuit of exciter 4 in a manner to return the voltage of generator 1 to the predetermined normal value.

In Fig. 2 I have shown an embodiment of my invention in a regulating system for direct-current dynamo-electric machines. The dynamo-electric machine as shown represents a direct current generator having an armature 43 which is connected to energize a direct-current distribution circuit 44. The various elements of the regulating system are diagrammatically illustrated as in Fig. 1 and the same numerals are used for similar parts. The only essential difference is in the actuating means for moving the flux modifying means of the alternating current motive device and its connection to the actuating lever 20. In this modification the inverted L-shaped member 20 is arranged to be pivoted at some point intermediate the extremities of the horizontal portion by pivots 45. A direct current solenoid having a plunger 46 and an energizing winding 47 is arranged for actuating the lever arm 20. The plunger 46 is connected to the end of the horizontal portion of the L-shaped arm 20. Means for counterbalancing the weight of the plunger and shown as a spring 48 is connected to the same portion of the lever arm 20 as plunger 46. The energizing winding 47 is connected to be energized in accordance with the voltage of the distribution circuit 44.

It is believed that the operation of the embodiment shown in Fig. 2 will be apparent from the cycle of operation previously described in connection with Fig. 1 and no further description is thought to be necessary for a clear understanding of the invention.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In a regulator, an alternating-current motive device having a primary single-phase inducing member, a movable induced member, flux-modifying means for producing a rotating magnetic field in said induced member, and means responsive to the condition to be regulated for controlling said flux-modifying means to control the movement of said induced member in proportion to variations in said condition.

2. In a regulator, an alternating-current induction device having a primary inducing member, a closed circuit secondary member, a movable flux shifting means in operative relation with said primary member, and means responsive to the condition to be regulated for producing a relative motion of traverse between said flux shifting means and said primary member in proportion to variations in said condition.

3. In a regulator, an alternating-current motive device having a primary single-phase inducing member, a rotatable induced member, a closed circuit conductor in the flux path between said members for producing a rotating magnetic field, and means responsive to the condition to be regulated for changing the position of said closed circuit conductor in said flux path in proportion to the departure of said condition from a predetermined value to control the direction of rotation of said induced member.

4. In a regulator, an alternating-current device having a primary single-phase inducing member with a salient pole, a closed circuit secondary member, a closed circuit conductor arranged for modifying the flux traversing said secondary member, and means responsive to the condition to be regulated for controlling the position of said closed crcuit conductor relative to the center line of said pole in proportion to the departure of said condition from a predetermined value.

5. In a regulator, an alternating-current device having a primary single-phase inducing member with a salient pole, a closed circuit secondary member, a closed circuit conductor arranged in the flux path between said pole and said secondary member, and means responsive to a departure of the condition to be regulated from a predetermined value for producing a relative motion of traverse between said closed circuit conductor and said pole in proportion to the magnitude of said departure.

6. In an alternating-current motive device having a primary single-phase inducing member, a rotatable induced member, a closed circuit conductor in the flux path between said members for producing a rotating magnetic field, means for changing the position of said closed circuit conductor in said flux path to control the direction of rotation of said induced member, and means operative in accordance with the movement of said induced member for returning said closed circuit conductor to a predetermined position intermediate the extremities of its travel.

7. In an alternating-current motive device having a primary single-phase inducing member, a movable induced member, a closed circuit conductor in the flux path between said members for producing a rotating magnetic field, means for changing the position of said closed circuit conductor in said flux path to control the direction of movement of said induced member, means operative in accordance with the direction of movement of said induced member for exerting a force tending to return said closed circuit conductor to a predetermined neutral position in said flux path, and resilient means interposed between said closed circuit conductor and said last mentioned means.

8. In an alternating-current motive device having a primary single-phase inducing member with a salient pole, a rotatable closed circuit secondary member, a closed circuit conductor arranged in the flux path between said pole and said secondary member, means including a lever arm for reversing the position of said closed circuit conductor relative to the center line of said pole, means including a piston connected to be operated by the rotation of said closed circuit secondary member in a direction opposite to the movement of said lever arm and a chamber within which said piston is arranged to reciprocate connected to said lever arm, and resilient means interposed between said chamber and said lever arm.

9. In combination, an electric circuit, means for controlling an electrical characteristic of said circuit, an induction motive device comprising a primary single-phase inducing member and a movable induced member for controlling said first mentioned means, flux-shifting means in operative relation with said induced member for controlling the direction of rotation of said induced member, and means operative in accordance with an electrical characteristic of said circuit for moving said flux-shifting means to cause said induced member to move in one direction in proportion to the amount the electrical characteristic of said circuit is above a predetermined value and in the opposite direction in proportion to the amount said electrical characteristic is below the predetermined value.

10. In combination, an electric circuit, a single-phase induction motive device having an inducing member and a rotatable induced member, a movable flux-modifying means for producing a rotating magnetic field in said members, and means responsive to an electrical characteristic of said circuit for controlling said flux-modifying means to control the rotation of said induced member in accordance with and in proportion to variations in said electrical characteristic from a predetermined value.

11. In combination, an electric circuit, an induction motive device having a primary single-phase inducing member, a closed circuit rotatable secondary member, a closed circuit conductor in the flux path between said members, and means responsive to the voltage of said electric circuit for shifting the position of said closed circuit conductor in said flux path.

12. In combnation, an electric circuit, resistance varying means for controlling the voltage of said circuit, an induction motive device comprising a single-phase inducing member and a closed circuit movable induced member for controlling said resistance varying means, a closed circuit conductor arranged to traverse the flux gap between said members for controlling the direction of movement of said induced member, and means responsive to the voltage of said electric circuit for varying the position of said closed circuit conductor to cause movement of said induced member in one direction when the voltage of said circuit is above a predetermined value and in the opposite direction when said voltage is below the predetermined value.

13. In combination, a dynamo-electric machine, an excitation circuit therefor, circuit controlling means in said excitation circut, an induction motive device comprising a single-phase inducing member and a closed circuit rotatable induced member for controlling said circuit controlling means, flux modifying means in operative relation with said inducing member for controlling the direction of rotation of said induced member, and means for controlling said flux modifying means in accordance with an electrical characteristic of said dynamo-electric machine.

14. In combination, a dynamo-electric machine, an excitation circuit therefor, a resistor in said excitation circuit, a movable element for controlling said resistor, an induction motive device comprising a single-phase inducing member and a closed circuit rotatable induced member for controlling said movable element, a closed circuit conductor arranged for traversing the flux path between said inducing and induced members for controlling the direction of rotation of said induced member, and means responsive to an electrical characteristic of said dynamo-electric machine for controlling the position of said closed circuit conductor in said flux path.

15. In a regulating system, an electric circuit, circuit controlling means for controlling an electrical characteristic of said circuit comprising a plurality of commutator segments connected by successive resistances, a plurality of movable contacts for said commutator segments having a resistance in series relation with each contact for effecting a plurality of successive changes in resistance during the transition of said movable contacts from one commutator segment to the next adjacent segment in either direction of travel, and means for moving said movable contacts in one direction when an electrical characteristic of said circuit is above a predetermined value and in the opposite directon when said electrical characteristic is below the predetermined value.

16. In a regulating system, a dynamo-electric machine, an excitation circuit therefor, circuit controlling means in said excitation circuit comprising a plurality of commutator segments connected by successive resistances, a plurality of separately insulated movable contacts arranged for successive initial engagement with each of said commutator segments, resistors having different values in series with each of said movable contacts respectively for effecting a plurality of successive changes in resistance in said excitation circuit during the transition of said movable contacts from one commutator segment to the next adjacent segment in either direction of travel, an induction motive device comprising a primary inducing member and a closed circuit induced member for effecting movement of said movable contacts, a closed circuit conductor in the flux path between said inducing and induced members for controlling the direction of rotation of said induced member, and means responsive to the voltage of said dynamo-electric machine for varying the position of said closed circuit conductor to cause rotation of said induced member in one direction when the voltage of said dynamo-electric machine is above a predetermined value and in the opposite direction when said voltage is below the predetermined value.

17. In combination, an electric circuit, circuit controlling means for controlling an electrical characeristic of said circuit, an induction-motive device comprising a single-phase inducing member and a closed circuit rotatable induced member for controlling said circuit controlling means, a closed circuit conductor arranged to traverse the flux gap between said members for controlling the direction of rotation of said induced member, means including a lever arm for moving said closed circuit conductor, means responsive to an electrical characteristic of said electric circuit for actuating said lever arm, means including retarded relatively movable members interposed between said lever arm and said rotatable induced member for transmitting a force tending to return said closed circuit conductor to a predetermined neutral position with respect to the limits of its traversing movement in accordance with the direction of travel of said induced member, and resilient means interposed between said relatively movable members and said lever arm.

18. In combination, a dynamo-electric machine, an excitation circuit therefor, a commutator-type of resistance in said excitation circuit comprising a predetermined number of resistance steps, a plurality of contact means having resistances in series therewith and in operative relation with said commutator for effecting changes in the resistance of said excitation circuit in steps equal to the product of said predetermined number of steps and the number of said contact means, an induction motive device comprising a single-phase inducing member and a closed circuit rotatable induced member for actuating said contact means, a closed circuit conductor arranged to traverse the flux gap between said members for controlling the direction of rotation of said induced member, means including a lever arm for moving said closed circuit conductor, an electro-responsive means connected to be energized in accordance with the voltage of said dynamo-electric machine for actuating said lever arm, a dashpot including a movable piston connected to be operated by the rotation of said closed circuit secondary member in a direction opposite to the movement of said lever arm and a chamber within which said piston is arranged to reciprocate connected to said lever arm, and resilient means interposed between said dashpot chamber and said lever arm.

In witness whereof, I have hereunto set my hand this 18th day of April 1929.

LOUIS W. THOMPSON.